US 6,721,095 B2

(12) United States Patent
Huber

(10) Patent No.: US 6,721,095 B2
(45) Date of Patent: Apr. 13, 2004

(54) COMBINED ILLUMINATED RETICLE AND FOCUS KNOB

(76) Inventor: Jeff Huber, 4324 Lower Fords, Orofino, ID (US) 83544

( * ) Notice: Subject to any disclaimer, the term of this patent is extended or adjusted under 35 U.S.C. 154(b) by 0 days.

(21) Appl. No.: 10/133,598

(22) Filed: Apr. 26, 2002

(65) Prior Publication Data

US 2002/0159148 A1 Oct. 31, 2002

Related U.S. Application Data

(60) Provisional application No. 60/286,915, filed on Apr. 27, 2001.

(51) Int. Cl.[7] ............................................. G02B 23/00
(52) U.S. Cl. ..................... 359/427; 359/425; 359/428; 42/122; 42/123; 42/130; 42/131
(58) Field of Search ................. 359/425, 426, 359/427, 428; 362/110, 113, 114; 42/119, 120, 121, 122, 123, 130, 131

(56) References Cited

U.S. PATENT DOCUMENTS 4,643,542 A * 2/1987 Gibson ........................ 359/424
5,025,564 A * 6/1991 Sanders ........................ 42/123
5,388,005 A * 2/1995 Wilson ........................ 359/694
6,516,551 B2 * 2/2003 Gaber ........................ 42/132

FOREIGN PATENT DOCUMENTS

DE 297 20 737 U1 3/1998

* cited by examiner

Primary Examiner—Drew Dunn
Assistant Examiner—Joshua L Pritchett
(74) Attorney, Agent, or Firm—Dean A. Craine

(57) ABSTRACT

A combined focus and reticle illumination system for a riflescope which uses a single, dual functioning turn knob mounted on the scope turret for focusing and activating and deactivating the illuminated reticle. During use, the turn knob is rotated to adjust the relative position of a sliding focusing cell assembly located inside the scope body in front of the erector tube. The reticle, attached to the proximal end of the erector tube, includes a side mounted LED. The turn knob has a push-pull movement and a battery located therein that disconnects and connects, respectively, the electric circuit. The sliding focusing cell includes a rigid outer housing that is resistant to bending and a rear sliding lens cell that is biased in a rearward direction to be self-centering during recoil. Wires extend from the turn knob to the LED along the scope sidewalls and are designed to preclude twisting.

19 Claims, 5 Drawing Sheets

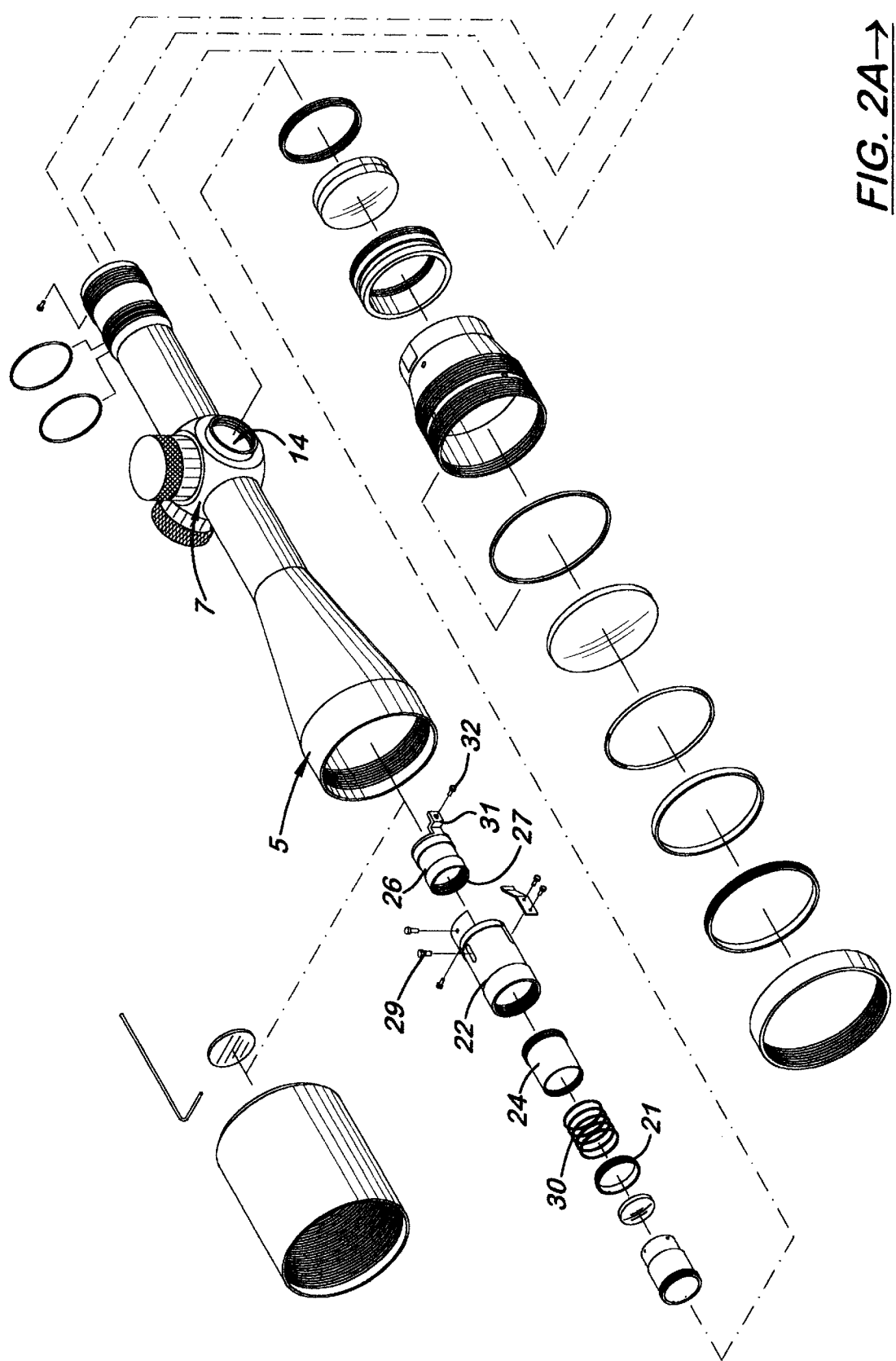

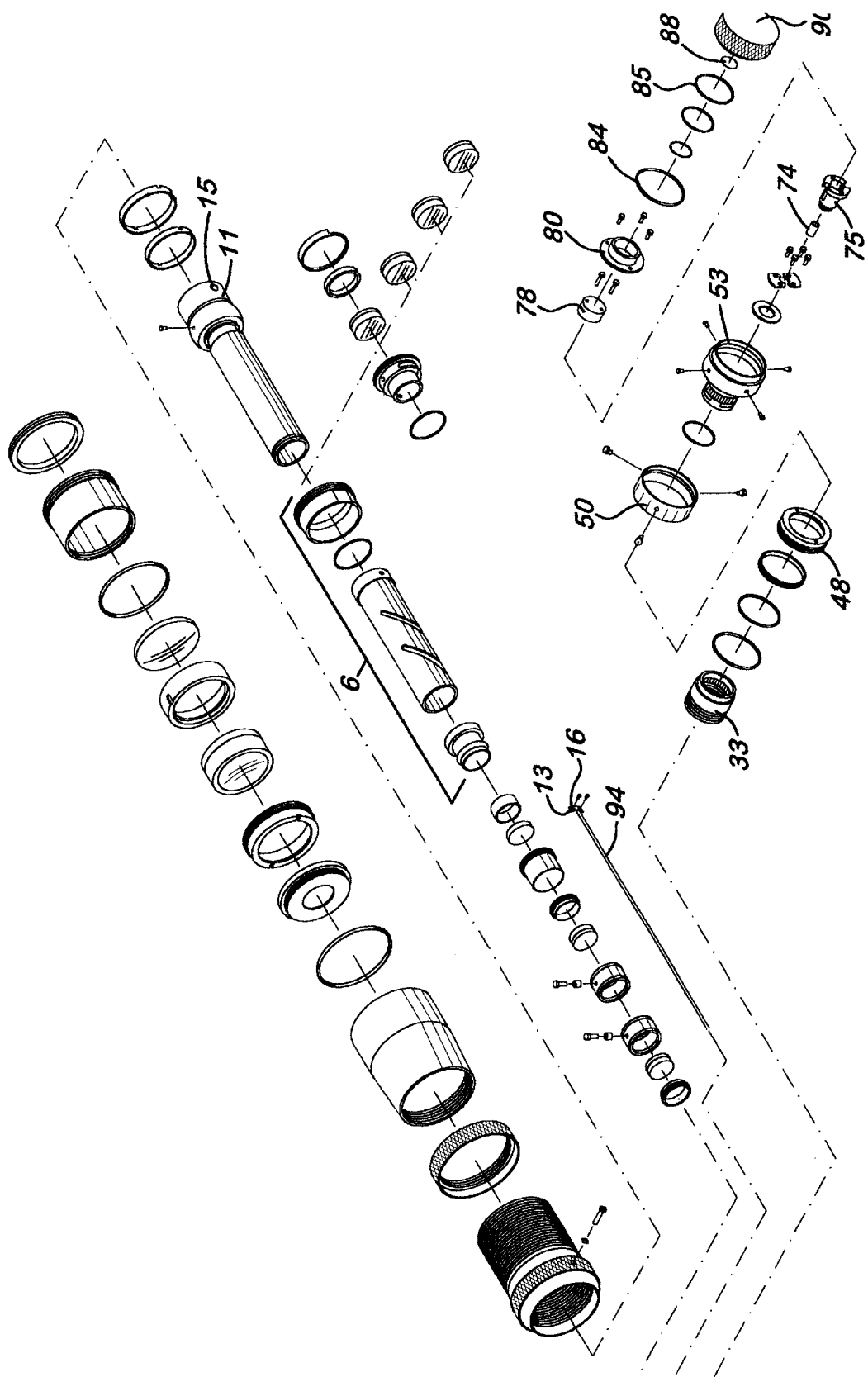

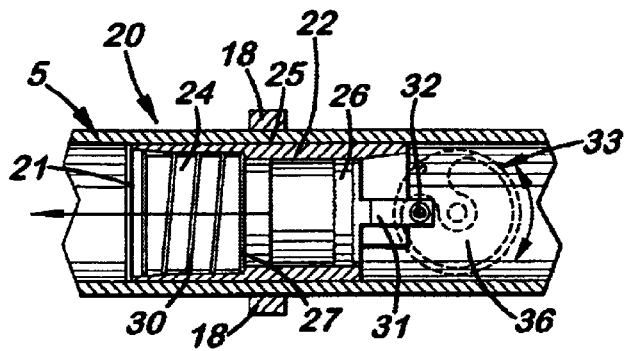
FIG. 3
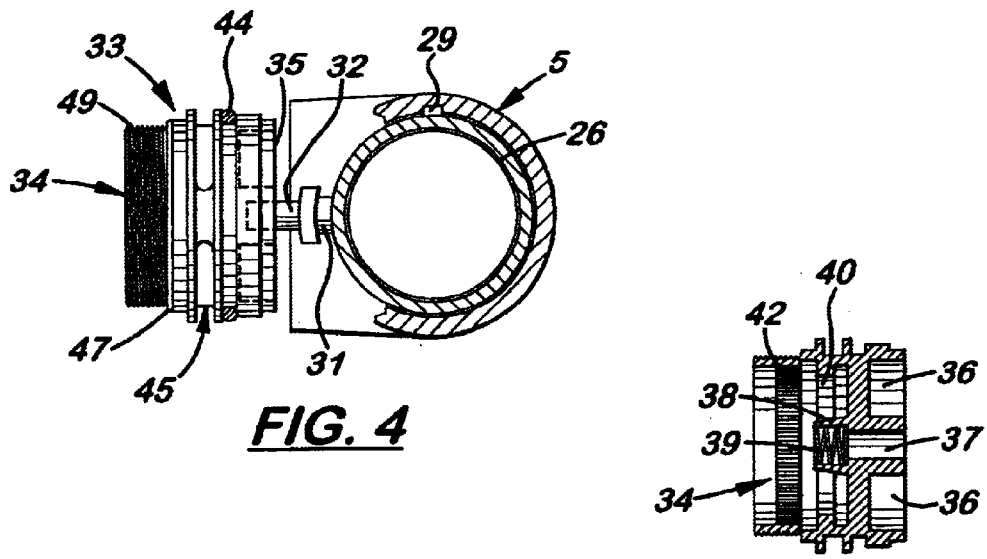
FIG. 4
FIG. 5
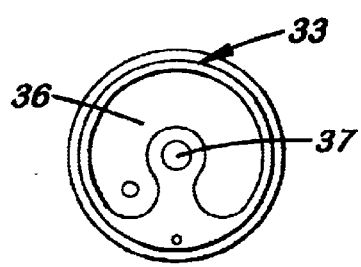
FIG. 6
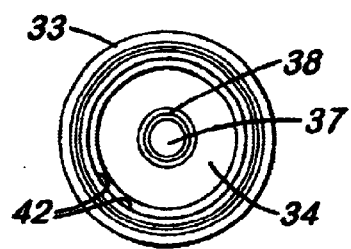
FIG. 7

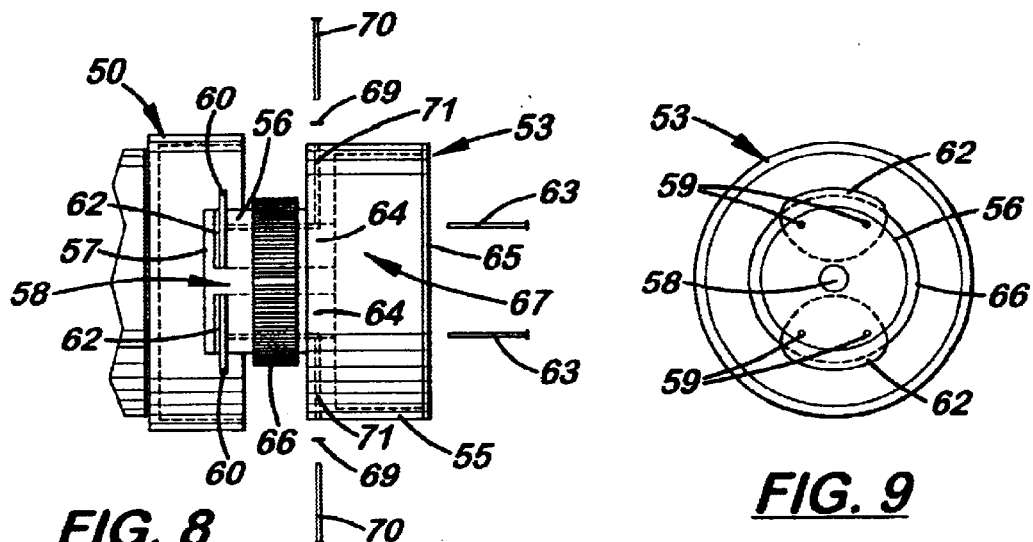
FIG. 8
FIG. 9
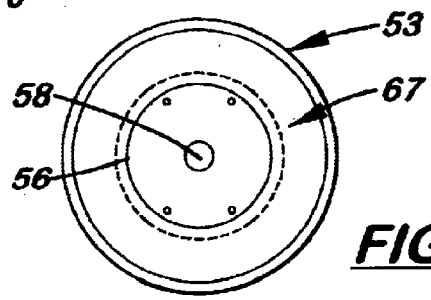
FIG. 10
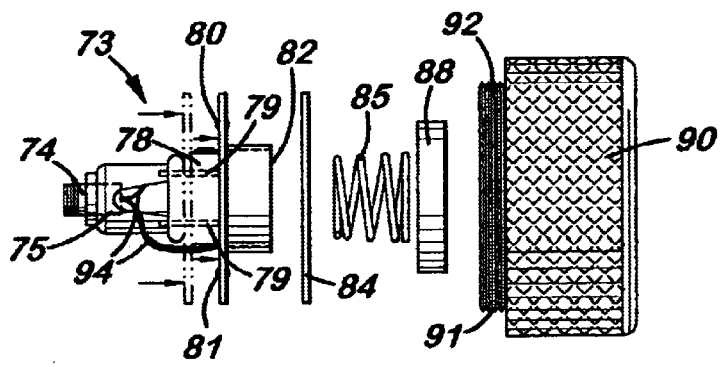
FIG. 11
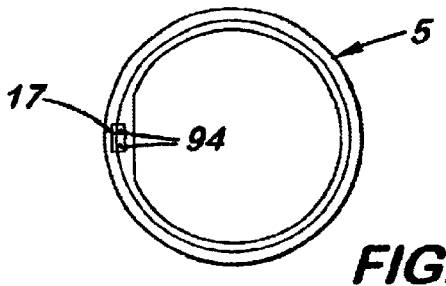
FIG. 12

COMBINED ILLUMINATED RETICLE AND FOCUS KNOB

This is a utility patent application based on a provisional patent application (Ser, No. 60/286,915) filed on Apr. 27, 2001.

BACKGROUND OF THE INVENTION

1. Field of the Invention

This invention pertains to riflescopes built with components having little tolerance to insure accuracy and more particularly, to scopes in which the activation and deactivation of the illumination reticles and the focusing operation of the lens are controlled by one turn knob.

2. Description of the Related Art

Riflescopes with illuminated reticles that enable users to aim at targets at night or in dark environments are common. Typically, the reticles are etched into the distal end of the erector tube located inside the scope and inmmediately in front of the eyepiece. When a light source is provided with the reticle, it is positioned in a small housing built into the scope body adjacent to the distal end of the erector tube or eyepiece. Disposed inside the housing are a watch battery, combination on/off switch, and rheostat switch that controls activation and brightness. An outer cap with calibration markings printed on its outer surface is mounted over the housing that is manually operated by the user.

One drawback with side mounted reticle control knobs is that they provide a port for water or moisture to enter the erector tube, the eyepiece, or the scope body. Another drawback is the control knob or eyepiece must be relatively large in order to hold the battery, the combination on/off switch, and the rheostat switch, thus making it susceptible to impacts.

In addition, due to the required large size of the turn knob for illuminated reticles, scope manufacturers typically produce eyepieces longer than necessary and with lenses smaller than desired. As a result, the overall length of the scope is increased and the user's field of view and eye relief is decreased.

Riflescopes having focus knobs attached to the scope turret that are used to change the relative position of the erector tube inside the riflescope are common. Typically, the focus knobs are coupled to the erector tube so that when the focus knob is rotated, the erector tube moves longitudinally inside the scope outer tube. Many riflescopes use an adjustable front cell disposed between the front lens and the erector tube. Typically, the front cells are moved by a peg inserted into the sides of the front cell from a side-mounted turn knob. When the turn knob is rotated, the front cell moves forward or backward inside the scope tube.

With extended use, slack or "play" develops between the outer surfaces of the front cell and the inside surface of the scope outer tube which affects the accuracy of the scope. Also, when a scope ring is attached tightly around the scope to attach it to the rifle, the scope body may be squeezed inward thereby preventing smooth movement of the focus cell within the outer body.

What is needed is a single knob system for controlling illumination of the reticle and focusing which overcomes the above-mentioned drawbacks. Single knob systems use fewer parts. They are more economical to manufacture and are more durable than the two separate systems used in the prior art.

SUMMARY OF THE INVENTION

It is an object of the present invention to provide a riflescope with a sliding front cell assembly that is more accurate and more durable.

It is another object of the present invention to provide such a riflescope with an illuminated reticle.

It is a further object to provide such a riflescope that has the illumination control knob and focus knob in one structure.

These and other objects are met by an improved riflescope having a combined focus and reticle illumination system which uses a single, dual functioning turn knob mounted on the scope turret for focusing and activating and deactivating the illuminated reticle.

The invention includes a novel focus cell assembly designed to create tighter tolerances between components for improved accuracy and increased durability. The focus cell assembly includes a cylindrical outer housing that is fixed inside the scope body. The outer housing houses a longitudinally aligned front lens assembly and a rear sliding cell that are selectively connected together. Disposed between the front lens assembly and the rear sliding cell is a rearward biasing means designed to provide resistance to the forward movement of the rear sliding cell with respect to the front lens assembly.

During use, the turn knob is rotated to adjust the relative position of the front cell assembly inside the scope body. The turn knob also has push or pull movement that is used to deactivate or activate, respectively, the LED located in the sidewall of the reticle. Housed inside the turn knob is a battery that moves inward and outward to disconnect and connect, respectively, from the contacts connected to the ends of the wires that extend longitudinally along the riflescope body from the turn knob to the LED.

The turn knob includes a cylindrical-shaped inner adaptor and a cylindrical-shaped outer adaptor longitudinally aligned and rotationally coupled together via a set of interconnected splines. Formed on the inside surface of the inner adaptor is a semi-circular groove, hereinafter called a helix groove, which receives a laterally extending pin connected to a rear sliding cell located inside the riflescope. During assembly, a pin and helix groove are interconnected so that the rear sliding cell moves longitudinally and smoothly inside the riflescope when the inner adaptor is rotated.

The outer adaptor is able to move longitudinally inward and outward a short distance when rotationally interconnected to the inner adaptor. Formed inside the outer adaptor is an outward extending cavity through which a fixed, insulated post extends. During assembly, a push/pull switch assembly is placed transversely over the post. When the outer adaptor is pressed inward, the push/pull switch assembly is moved inward to a non-contacting position with respect to the battery located in the cap. When pulled outward, the push/pull switch is activated so that the electric circuit with the battery is complete to illuminate the LED.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

FIG. 2 is an exploded, perspective view of a riflescope with the combined focus and reticle illumination system.

FIG. 3 is a side elevational view of the slide lens assembly located inside the scope body.

FIG. 4 is a rear plan view of the inner adaptor attached to the arm on the slide lens assembly.

FIG. 5 is a sectional side elevational view of the inner adaptor.

FIG. 6 is a rear end view of the inner adaptor.

FIG. 7 is a front end view of the inner adaptor.

FIG. 8 is a side elevational view of the outer adaptor.

FIG. 9 is a rear end view of the outer adaptor.

FIG. 10 is a front end view of the outer adaptor.

FIG. 11 is a side elevational view of the switch assembly, battery, and turn knob.

FIG. 12 is a rear elevational view of the riflescope showing the placement of the wires that extend along the side of the scope body.

DESCRIPTION OF THE PREFERRED EMBODIMENT(S)

Figure 1:
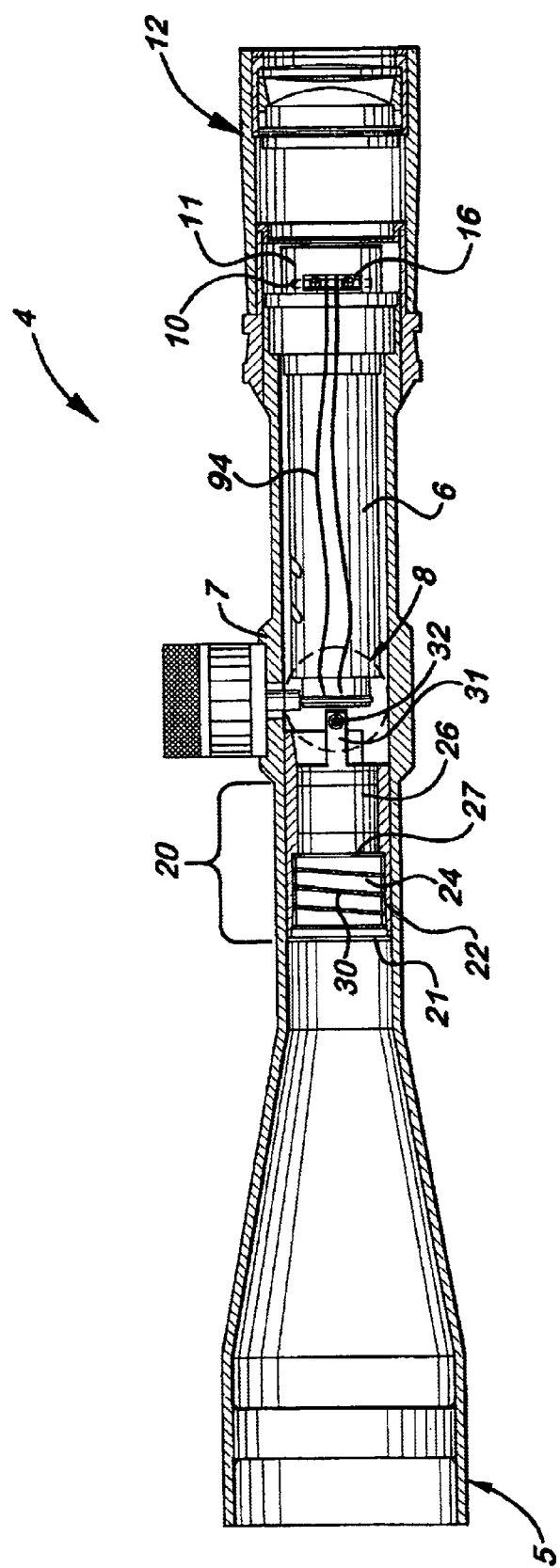
FIG. 1 is a side elevational view of a riflescope with the combined focus and reticle illumination system.

Referring to the accompanying Figs., there is shown and described a combined focus and reticle illumination system generally referenced as 4, for a riflescope 5 which uses a single, dual functioning turn knob 8 mounted on the scope turret 7 for focusing and activating and deactivating the scope illuminated reticle assembly 10. During use, the turn knob 8 may be rotated to adjust the relative position of the front cell assembly 20 located inside the riflescope 5. The turn knob 8 also has push-pull movement ability that is used to deactivate or activate, respectively, an LED 13 located in the sidewall of the reticle housing 11 immediately forward of the eyepiece 12. When the turn knob 8 is pushed or pulled, a circuit board 80, located inside the outer adaptor 53, disconnects and connects, respectively, to a battery 88 located inside the turn knob cap 90. Wires 94 connected at one end to the circuit board 80 extend back through the turret 7 and longitudinally along the sidewalls of the riflescope 5 to the reticle located in the reticle assembly 10. The LED 13 is attached to the ends of the wires 94 that extend into the reticle housing 11 to provide illumination.

As shown in FIGS. 1–3, the riflescope 5 includes a front cell assembly 20 mounted in a fixed position inside the riflescope 5 slightly ahead of the turret 7 and adjacent to the distal end of the erector tube 6. The front cell assembly 20 includes a cylindrical-shaped, hollow outer housing 22, wedged tightly inside the riflescope 5, and a transversely aligned front retaining ring 21 fixed in position over the front edge of the outer housing 22. Disposed inside the outer housing 22 is a cylindrical-shaped front lens assembly 24 threadingly connected to the front edge of the cylindrical-shaped rear sliding cell 26. Both the front lens assembly 24 and rear sliding cell 26 are capable of sliding longitudinally inside the outer housing 22 and partially through the center bore (not shown) formed in the retaining ring 21. Formed on the front edge of the rear sliding cell 26 is a circular lip 27 that acts as a stop surface for a spring 30 disposed over the front lens assembly 24. Because the front lens assembly 24 and rear sliding cell 26 are threadingly joined together and disposed longitudinally inside the outer housing 22, the front lens assembly 24 and the rear sliding cell 26, as a unit, are forcibly moved forward inside the outer housing 22, which compresses the spring 30 between the retaining ring 21 and the circular lip 27. When force is removed, the joined front lens assembly 24 and rear sliding cell 26 move rearward to their original position inside the outer housing 22. As shown more clearly in FIG. 4, extending through a slot (not shown) formed on the upper surface of the outer housing 22 is a upward extending guide pin 29 that connects to a bore (not shown) formed on the outer surface of the rear sliding cell 26. The guide pin 29 acts as a stopping means to prevent excessive movement of the rear sliding cell 26 within the outer housing 22.

Formed on the rear surface of the rear sliding cell 26 is a raised, laterally extending arm 31 with a perpendicularly aligned projecting peg 32 attached thereto. The extension arm 31 and peg 32 are positioned on the rear sliding cell 26 so that the peg 32 is centrally aligned over the side-mounted turn knob opening 14 formed on the turret 7. In the preferred embodiment, the peg 32 is made of low friction material, such as nylon, able to freely rotate on the extension arm 31.

Disposed longitudinally inside the opening 14 is a cylindrical-shaped inner adaptor 33. As shown in FIGS. 4–5, the inner adaptor 33 has a main cavity 34 and a flat end surface 35. Formed on the end surface 35 is the helix groove 36 designed to receive the peg 32 attached to the rear sliding cell 26 when the inner adaptor 33 is placed inside the opening 14. Formed centrally on the inner adaptor 33 is a longitudinally aligned small bore 37. Formed on the inside surface of the main cavity 34 is a raised, concentrically aligned neck 38. Formed centrally on the neck 38 are internal threads 39 designed to attach to threads located on a support post 75 shown in FIG. 11 and discussed later. Formed on the inside surface of the main cavity 34 is a circular groove 40. Also formed on the inside surface of the main cavity 34 is a set of internal splines 42 designed to mesh with external splines 66 formed on the outer adaptor 53 shown in FIGS. 8–10 and discussed further below.

Formed on the outside surface of the inner adaptor 33 is an O-ring groove 43 designed to receive an O-ring 44. Also formed on the outside surface is a stop groove 45 designed to receive a stop pin (not shown) that extends downward from the turret 7. Also formed on the outside surface of the inner adaptor 33 is a set of external threads 47 that connect to a set of internal threads formed on a retainer ring 48 shown more clearly in FIG. 2. During assembly, the retainer ring 48 is attached to the inner adaptor 33 and connected to the internal threads on the opening 14 to hold the inner adaptor 33 inside the opening 14. Formed near the distal end of the inner adaptor 33 is a set of external, parallel groove structures 49 that, as described further below, provide a "clicking" surface for a ball 69 and threaded screw 70 attached to the outer adaptor 53.

The outer adaptor 53, shown more clearly in FIGS. 2, 8–10, is longitudinally aligned and coupled to the inner adaptor 33. In the preferred embodiment, the outer adaptor 53 includes a narrow cylindrical-shaped neck section 56 and a larger, cylindrical-shaped outer body 55. The end surface 57 of the neck section 56 is flat with one central non-threaded bore 58 and four small threaded bores 59 formed therein. The small threaded bores 59 are radially aligned around the central bore 58 formed transversely on opposite sides of the neck section 56. Also on opposite sides of the neck section 56 are two slots 60 that extend through the sidewalls of the neck section 56. During assembly, two small brass ear structures 62 are inserted into the slots 60 and are secured in place via screws 63 that connect to threaded bores 64 formed on the inside surface of the neck section 56. During assembly, the neck section 56 is inserted into the main cavity 34 on the inner adaptor 33. The outer portions of the ear structures 62 extend laterally from the neck section 56 into the circular groove 40 formed on the inside surface of the main cavity 34 of the inner adaptor 33 to couple the inner and outer adaptors 33, 53 together. The ear structures 62 are thinner than the circular grooves 40, thereby enabling the outer adaptor 53 to move longitudinally inward and outward from the inner adaptor 33. Formed centrally on the neck section 56 are external splines 66 designed to interconnect with the internal splines 42 formed on the inner adaptor 33. The internal and external splines 42, 66, respectively, are sufficient in length so that they remain engaged when the outer adaptor 53 is moved inward and outward longitudinally over the inner adaptor 33.

Formed inside the outer body 55 of the outer adaptor 53 is an outer extending, cylindrical main cavity 67. Formed through the sidewall of the outer body 55 is a fully extending threaded bore 58. During assembly, the inner and outer adaptors 33, 53, respectively, are pressed together so that the two sets of splines 42, 66, respectively, interconnect to rotationally lock the adaptors space 33, 53, respectively, together. Once connected together, a ball 69 and screw 70 are inserted into the threaded bores 71 formed on opposite sides of the outer body 55. The screw 70 is tightened inside the bore 71 so that the ball 69 applies a desirable amount of pressure against the parallel groove structures 49 formed on the outside surface of the inner adaptor 33, as shown in FIG. 4. The ball 69 and groove structures 49 provide a "clicking" sound and feeling when the outer adaptor 53 is pulled and pushed from the inner adaptor 33.

Disposed inside the main cavity 67 formed in the outer adaptor 53 is the push-pull switch assembly 73. In the preferred embodiment, the push-pull switch assembly 73 includes a cylindrical post member 74 inserted into one end of a support post 75. Attached to the distal end of the support post 75 opposite the post member 74 is an insulation pad 78. Small screws 79 are used to attach the insulation pad 78 to the upper surface of the support post 75. Disposed around the insulation pad 78 is a circular circuit board 80. The circuit board 80 includes a chip (not shown) and adjustable rheostat 81 and is attached to a centrally aligned metallic cylindrical-shaped ring outer 82 that fits tightly around the insulation pad 78. The rheostat 81 includes an adjustment screw (not shown) that enables the level of illumination of the LED 13 to be adjusted by the manufacturer or user. Small screws (not shown) attach the circuit board 80 to the inside wall on the outer adaptor 53. Disposed over the circuit board 80 are an insulation washer 84, a spring 85, a battery 88, and the turn knob cap 90. The turn knob cap 90 includes a neck section 91 with external threads 92 that connect to internal threads 65 formed on the inside surface of the outer adaptor 53. During use, when the turn knob cap 90 is attached to the outer adaptor 53 and then pushed or pulled, the outer adaptor 53 moves inward and outward, respectively, which moves the circuit board 88 inward and outward over the insulation pad 78, respectively, as shown in FIG. 11. When the circuit board 80 is pushed inward, the outer ring 82 moves out of contact with the battery 80 thereby disconnecting the circuit between the battery 88 and the LED 13. When the circuit board 80 is pulled outward, the outer ring 82 extends outward beyond the insulation pad 78 and makes contact with the battery 88 thereby connecting the circuit between the battery 88 and the LED 13.

As shown in FIG. 2, the reticle housing 11 of the reticle assembly 10 is attached to the proximal end of the erector tube 6. The LED 13 extends inward from the sides of the reticle housing 11 adjacent to the reticle (not shown). The LED 13 extends through a hole 15 formed on the sides of the reticle housing 11 and is mounted on a curved bracket 16. The wires 94 extend forward from the LED 13 along a small groove 17 formed on the sides of the riflescope 5, as shown in FIG. 12. The wires 94 then extend through the side-mounted turn knob opening 14 on the turret 7 and then perpendicularly through the bores 37, 58 formed on the inner adaptor 33, the outer adaptor 53 and the post member 74. The ends of the wires 94 extend laterally through the side slot openings formed on the support post 75 and connect to positive and negative terminals on the circuit board 80, as shown in FIG. 11.

The above-described system 4 is used to adjust both the focus and the illumination of the reticle assembly 10 using one side turn knob 8. When the turn knob 8 is rotated, the focus cell assembly 20 moves forward and rearward to adjust the focus of the scope. The turn knob 8 may be selectively pulled outward to turn on illumination of the reticle assembly 10. When the turn knob 8 is pulled outward, the focus can still be adjusted since the external splines 66 on the inner and outer adaptors 33, 53, respectively, are engaged at all times.

The wires 94 that connect the battery 88 to the LED 13 extend from the turn knob cap 90 and along the sides of riflescope 5. Because the ends of the wires 94 connect to an outer ring 82 on the circuit board 80 and because the turn knob 8 only turns approximately 320 degrees, the wires 94 are not twisted. Also, if the rifle is placed on its side and pressure is exerted on the turn knob 8, the LED 13 automatically turns OFF rather than ON to prevent discharge of the battery 88.

The inner and outer adaptors 33, 53 are made of polished aluminum and the peg 32 is made of nylon so that it travels smoothly inside the helix 36 formed on the end surface 35 of the inner adaptor 33.

By using a front cell assembly 20 that includes an outer housing 22 around a front lens assembly 24 and a rear sliding cell 26, the cavity through which the rear sliding cell 26 moves remains straight and less susceptible to bending caused by the scope clamping mechanism. The front lens assembly 24 and rear sliding cell 26 are made of polished aluminum with small tolerances between their sidewalls and the inside surface of the outer housing 22. By making three separate pieces with small tolerances, exact fitting can be achieved between the parts before being inserted into the scope body. In the preferred embodiment shown in FIG. 3, the diameter of the outer housing 22 along its central axis is reduced thereby creating a relief gap 25 to accommodate the riflescope 5 being squeezed inward by scope rings 18.

In compliance with the statute, the invention described herein has been described in language more or less specific as to structural features. It should be understood, however, that the invention is not limited to the embodiments described herein or to specific features shown, since the means and construction shown, comprised only of the preferred embodiments for putting the invention into effect. It is also understood that the phraseology and terminology employed herein are for the purpose of description and should not be regarded as limiting. The invention is therefore claimed in any of its forms or modifications within the legitimate and valid scope of the amended claims, appropriately interpreted in accordance with the doctrine of equivalents.

Further, the purpose of the foregoing abstract is to enable the U.S. Patent and Trademark Office personnel, patent bar practitioners, and the general public, to determine quickly from a cursory inspection the nature and essence of the technical disclosure of the application. The Abstract is neither intended to define the invention of the Application, which is measured by the claim, nor is it intended to be limiting as the scope of the invention in any way.

I claim:

1. An improved riflescope having a hollow scope body, a front objective lens, an erector tube with a reticle housing attached at one end, said improvement comprising:

a. a front cell assembly disposed inside the scope body between the front objective lens and the erector tube, said front cell assembly including a cylindrical outer body, a front lens assembly, and a rear cell assembly, spaced apart and transversely aligned therein, said front lens assembly being fixed in position in front of said rear cell assembly;

b. a turn knob coupled to said rear cell assembly to adjust the relative position of said rear cell assembly to said front lens assembly;

c. a reticle illumination means connected to the reticle housing;

d. a battery disposed inside said turn knob and electrically connected to said reticle illumination means, and;

e. a switch means disposed inside said turn knob enabling said reticle illumination means to be deactivated or activated by longitudinally moving said turn knob.

2. The improved riflescope, as recited in claim 1, further including a biasing means disposed inside said outer housing to provide a rearward biasing force between said rear cell assembly and said front lens assembly.

3. The improved riflescope, as recited in claim 2, wherein said rear cell assembly includes a laterally extending peg that is engaged by said turn knob so that when said turn knob is turned, said rear cell assembly moves longitudinally inside said outer housing.

4. The improved riflescope, as recited in claim 3, wherein said turn knob includes an inner adapter and an outer adapter rotatably locked together with said switch means disposed inside said outer adapter, said inner adapter being cylindrical-shaped with a closed end with a helix groove formed therein capable of receiving said peg on said rear cell assembly.

5. The improved riflescope, as recited in claim 4, wherein said inner adapter and said outer adapter are rotationally locked together by a set of interlocking internal and external splines formed on the adjacent surfaces of said inner and said outer adapters.

6. The improved riflescope, as recited in claim 5, wherein said switch means includes a post member affixed at one end to said outer adapter and a support post attached to the opposite end of said post member, an insulation pad attached to said support post, and a circuit board disposed over said insulation pad, said circuit board including a contact ring that moves longitudinally over said post between inward and outward positions to disconnect and connect said circuit board to said battery disposed in said turn knob.

7. The improved riflescope, as recited in claim 6, further including a stop surface formed on said inner adapter and outer adapter to limit the inward and outward relative movement of said inner adapter and said outer adapter when coupled together.

8. The improved riflescope, as recited in claim 7, wherein said reticle illumination means in at least one LED electrically connected to said circuit board.

9. The improved riflescope, as recited in claim 8, wherein said LED is attached to a bracket mounted on the sides of said reticle housing.

10. An improved riflescope having a hollow scope body, a front objective lens, an erector tube with a reticle housing attached at one end, said improvement comprising:

a. a sliding focus cell assembly disposed inside said scope body between said front objective lens and said erector tube, said focus cell assembly including a cylindrical outer body, a front lens assembly, and a rear cell assembly, said front lens assembly and said rear cell assembly being longitudinally aligned inside said outer body, said rear cell assembly having a laterally extending peg that is engaged by said turn knob so that when said turn knob is turned, said rear cell assembly is longitudinally moved inside said outer housing/;

b. a turn knob coupled to said sliding focus cell to manually adjust the position of said front lens assembly inside said scope body, said turn knob including a an inner adapter and an outer adapter rotatably locked together with a push-pull switch disposed inside said outer adapter, said inner adapter being cylindrical-shaped with a closed end with a helix formed therein capable of receiving said peg on said rear cell assembly;

c. a coupling means connecting said turn knob to said rear cell assembly;

d. an illuminated means located adjacent to recticle to provide illumination thereto;

e. a battery disposed inside said turn knob and electrically connected to said illumination means, and;

f. a push-pull switch means disposed inside said turn knob enabling said electric illumination means to be deactivated or activated by pushing or pulling, respectively, said turn knob.

11. The improved riflescope, as recited in claim 10, wherein said inner adapter and said outer adapter are rotationally locked together by a set of interlocking internal and external splines formed on the adjacent surfaces of said inner and said outer adapters.

12. The improved riflescope, as recited in claim 11, wherein said push-pull switch means includes a post member affixed at one end to said outer adapter and a support post attached to the opposite end of said post member, an insulation pad attached to said support post, and a circuit board disposed over said insulation pad, said circuit board including a contact ring that moves longitudinally over said post between inward and outward positions to disconnect and connect said circuit board to said battery disposed in said turn knob.

13. The improved riflescope, as recited in claim 12, further including a stop surface formed on said inner adapter and outer adapter to limit the inward and outward relative movement of said inner adapter and said outer adapter when coupled together.

14. The improved riflescope, as recited in claim 13, wherein said illumination means is at least one LED mounted on said reticle housing.

15. The improved riflescope, as recited in claim 14, wherein said LED is attached to a bracket mounted on the sides of the reticle housing.

16. An improved riflescope having a hollow scope body, a front objective lens, an erector tube with a reticle housing attached at one end, said improvement comprising:

a. a sliding focus cell assembly disposed inside said scope body between said front objective lens and said erector tube, said focus cell assembly including a cylindrical outer body, a front lens assembly, and a rear cell assembly, said front lens assembly and said rear cell assembly being longitudinally aligned and biased apart inside said outer body, said rear cell assembly having a laterally extending peg;

b. a turn knob coupled to said sliding focus cell to manually adjust the position of said front lens assembly inside said scope body, said turn knob includes an inner adapter and an outer adapter rotatably locked together with a push-pull switch disposed inside said outer adapter, said inner adapter being cylindrical-shaped with a closed end with a helix groove formed therein capable of receiving said peg on said rear cell assembly;

c. an illumination means to provide illumination to a reticle located in said reticle housing;

d. a battery disposed inside said turn knob and electrically connected to said electric illumination means, and;

e. a push-pull switch means disposed inside said turn knob enabling said electric illumination means to be deactivated or activated by pushing or pulling, respectively, said turn knob.

17. The improved riflescope, as recited in claim 16, wherein said inner adapter and said outer adapter are rotationally locked together by a set of interlocking internal and external splines formed on the adjacent surfaces of said inner and said outer adapters.

18. The improved riflescope, as recited in claim 16, wherein said push-pull switch means includes a post member affixed at one end to said outer adapter and a support post attached to the opposite end of said post member, an insulation pad attached to said support post, and a circuit board disposed over said insulation pad, said circuit board including a contact ring that moves longitudinally over said post between inward and outward positions to disconnect and connect said circuit board to said battery disposed in said turn knob.

19. The improved riflescope, as recited in claim 16, wherein said illumination means is a LED located on the reticle housing.

* * * * *